United States Patent [19]

Nadkarni et al.

[11] Patent Number: 5,116,679
[45] Date of Patent: May 26, 1992

[54] PROCESS FOR PRODUCING FIBRES COMPOSED OF OR COATED WITH CARBIDES OR NITRIDES

[75] Inventors: Sadashiv K. Nadkarni; Mukesh K. Jain, both of Jonquiere, Canada

[73] Assignee: Alcan International Limited, Montreal, Canada

[21] Appl. No.: 385,248

[22] Filed: Jul. 25, 1989

[30] Foreign Application Priority Data

Jul. 29, 1988 [CA] Canada ................................. 573505

[51] Int. Cl.$^5$ .............................................. B05D 7/24
[52] U.S. Cl. .................................. 428/367; 423/291; 423/346; 427/215; 427/249; 427/255.4; 428/366
[58] Field of Search ............ 427/215, 249, 255.4; 423/345, 346, 291; 428/366, 367

[56] References Cited

U.S. PATENT DOCUMENTS

| 2,839,426 | 6/1958 | Gerby | 427/255.2 |
|---|---|---|---|
| 4,118,464 | 10/1978 | Cutler | 423/346 |
| 4,284,612 | 8/1981 | Horne, Jr. et al. | 423/345 |
| 4,481,179 | 11/1984 | Wei | 423/346 |
| 4,536,379 | 8/1985 | Carlson et al. | 423/345 |
| 4,605,688 | 8/1986 | Simpson et al. | 428/288 |
| 4,789,536 | 12/1988 | Schramm et al. | 423/346 |
| 4,832,929 | 5/1989 | Saiki et al. | 423/346 |
| 4,849,196 | 7/1989 | Yamada et al. | 423/346 |

FOREIGN PATENT DOCUMENTS

| 2123572 | 5/1971 | Fed. Rep. of Germany. | |
| 2909023 | 9/1979 | Fed. Rep. of Germany | 423/345 |
| 2133771 | 2/1973 | France. | |
| 2528823 | 12/1983 | France. | |
| 50-18479 | 6/1975 | Japan | 423/345 |
| 57-003780 | 1/1982 | Japan. | |
| 57-100742 | 6/1982 | Japan. | |
| 58-36915 | 3/1983 | Japan | 423/345 |
| 58-49698 | 3/1983 | Japan | 423/345 |
| 58-104078 | 6/1983 | Japan. | |
| 58-120599 | 7/1983 | Japan | 423/345 |
| 60-131884 | 7/1985 | Japan. | |
| 61-22000 | 1/1986 | Japan | 523/346 |
| 61-227995 | 10/1986 | Japan. | |
| 54-090216 | 5/1987 | Japan. | |
| 1-104879 | 4/1989 | Japan. | |
| 1417134 | 12/1975 | United Kingdom. | |

Primary Examiner—Shrive Beck
Assistant Examiner—Terry J. Owens
Attorney, Agent, or Firm—Cooper & Dunham

[57] ABSTRACT

A process for producing fibres composed of or coated with carbides or nitrides. The process involves forming a first reaction zone containing microfine particles of an oxide (or oxide precursor) of silicon or a suitable metal (e.g. boron) uniformly mixed with carbon (or a carbon precursor); forming a second reaction zone comprising a layer having a thickness of 1 cm or less of a porous mass having a density of 1 g/cc or less formed of short or continuous fibres made of or coated with carbon (or carbon precursor); heating the first reaction zone in a non-oxidizing atmosphere to generate a gaseous sub-oxide of the silicon or metal; simultaneously heating the second reaction zone so that the gaseous sub-oxide diffuses into it and reacts with the carbon to form carbide or nitride on the fibres; and separating the resulting fibres from any carbide or nitride whiskers that may have formed in the second rection zone. Short or continuous fibres (e.g. in the form of a fabric or paper-like sheets) consisting of or coated with carbides or nitrides can be formed in this way.

36 Claims, 3 Drawing Sheets

5,116,679

PROCESS FOR PRODUCING FIBRES COMPOSED OF OR COATED WITH CARBIDES OR NITRIDES

BACKGROUND OF THE INVENTION

I. Field of the Invention

This invention relates to a process for producing fibres composed of, or coated with, carbides or nitrides of such elements as e.g. silicon and boron.

II. Description of the Prior Art

Continuous and short fibres made of SiC and similar carbides and nitrides are very useful for reinforcing a variety of materials such as metals and ceramics in order to improve the toughness or high temperature performance of such materials. The usefulness of the fibres arises not only from their inherent hardness and tensile strength, but also from the fact that the fibres generally are stable in oxidizing atmospheres and at high temperatures and tend not to react with the ceramic or metal matrix.

From these points of view, fibres of this kind are superior to carbon fibres often used for the same purposes. For example, when carbon fibres are used to reinforce aluminum metal, enormous pressures must be used to cause the molten aluminum to impregnate the fibres because carbon is not wetted by the molten aluminum. Moreover, the carbon reacts with the aluminum to form $Al_4C_3$ at the interface and the resulting composite is of low strength. Attempts have been made in the past to overcome these problems by coating carbon fibres with materials such as metals (e.g. Ni) or carbides or borides, etc. in order to make the fibres wettable and to make their surfaces inert. The coating methods attempted have included plasma spraying, chemical vapour deposition, sputtering, etc. but there has been limited success due to poor penetration of the coating materials into fibre bundles, high costs and unacceptable losses of coating material etc.

Despite the superiority of fibres made of carbides and the like as mentioned above, the conventional fibres of this kind have a number of problems For example, SiC fibres are often manufactured by degrading a polycarbosilane type of precursor, but the high temperature stability of such fibres is low because they undergo a crystallization change at temperatures of about 1300°–1400° C. and thus tend to fall apart at these temperatures. It is also difficult to manufacture long or continuous fibres of carbides and the like, and although it has been reported that continuous SiC fibres can be made by heating a precursor fibre containing $SiO_2$ or Si particles distributed in a carbon precursor such as pitch, attempts to duplicate such a process have not been successful. SiC particles are indeed formed, but they do not sinter together even at temperatures exceeding 2000° C. and thus they do not retain the original fibre shape.

It has been known that suboxides such as SiO can be formed by reacting $SiO_2$ and C or $SiO_2$ and Si etc. and reacted with a graphite surface to form a coating. For example JP 58104078-A, JP 540090216-A etc. refer to the reaction of SiO(g) with graphite to form a coating on the surface. The SiO(g) is produced in a separate reactor and transported to the graphite surface. This is feasible at temperatures above 1800° C. as at lower temperatures SiO can re-convert to $SiO_2$ and Si (or, in presence of CO, to $SiO_2$ and C). Coating of a carbon fibre mass by this method results in two problems:

a) due to improper infiltration, the coating formed is non uniform; and b) as the reaction is conducted at high temperatures, the coatings are very granular and highly porous.

Accordingly, there is a need for an improved process for producing fibres made of, or coated with, carbides or nitrides, which process overcomes some or all of the disadvantages mentioned above.

SUMMARY OF THE INVENTION

According to one aspect of the invention, there is provided a process for preparing fibres consisting of or coated with a carbide or nitride, which process comprises: forming a first reaction zone comprising microfine particles of an oxide or oxide precursor of silicon or a suitable metal uniformly dispersed within a matrix of carbon or a carbon precursor, wherein the molar ratio of the oxide present as a starting material or derivable from the oxide precursor to the carbon present as a starting material or derivable from the carbon precursor is equal to or slightly greater than the stoichiometrical ratio required for the generation of a gaseous sub-oxide of silicon or said metal; forming a second reaction zone closely adjacent to the first reaction zone, said second zone comprising a layer having a thickness of about 1 cm or less of a porous mass having a density of about 1 g/cc or less formed of fibres selected from the group consisting of carbon fibres, fibres of a heat resistant non-carbonaceous material coated with carbon, fibres made of a carbon precursor and fibres made of a heat resistant non-carbonaceous material coated with a carbon precursor; heating said first reaction zone in a non-oxidizing atmosphere which promotes the formation of a suboxide over a carbide or nitride to a temperature at which said carbon precursor, if present, is converted to carbon, said oxide precursor, if present, is converted to said oxide, and then a gaseous sub-oxide is formed by the reaction of the oxide and carbon in the first reaction zone and the gaseous sub-oxide diffuses to the second reaction zone; simultaneously heating said second reaction zone to a temperature no lower than that in the first reactive zone in a suitable non-oxidizing atmosphere and to a temperature at which said carbon precursor, if present, is converted to carbon and the gaseous suboxide reacts with some or all of the carbon in the second reaction zone to form carbide or nitride on said fibres; and separating the resulting fibres from any carbide or nitride whiskers that may also have been formed in the second reaction zone.

According to another aspect of the invention, there is provided a system whereby the transfer of the suboxide gas by diffusion only is promoted, and at the same time the reaction of the precursor oxide with the fibre is prevented. This is achieved by:

1. Keeping the oxide in the first zone away from the fibre in the second zone by completely coating each particle of oxide with the carbon or carbon precursor;
2. Producing the suboxide in the first zone; and
3. Transferring the suboxide to the second zone by diffusion only, for reaction with the carbon there. This is done at a temperature below 1600°, and above 1300° C.

The term "microfine" as used herein to describe particles means that the particles generally all have a diameter of less than 5 μ, and preferably less than 1 μ.

The term "sub-oxide" means an oxide of silicon or a metal which contains fewer bonded oxygen atoms than the oxides which are stable at room temperature.

The term "carbon precursor" means a compound which can be converted to elemental carbon upon being heated to a suitable temperature in a non-oxidizing atmosphere.

The term "oxide precursor" means a compound which is converted to an oxide when heated to a suitable temperature.

DESCRIPTION OF THE PREFERRED EMBODIMENTS

Figure 1:
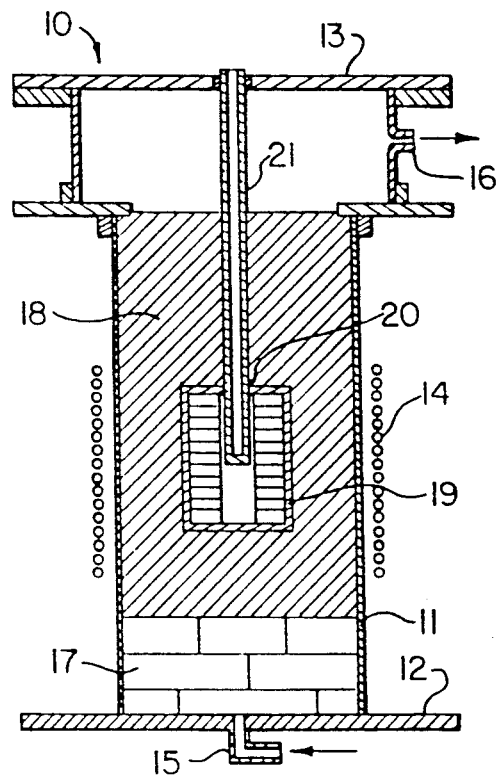
FIG. 1 is a cross section of an induction furnace containing a graphite reactor.

As will be explained more fully later, whether the fibre product comprises a carbide or nitride depends on the atmosphere and other conditions employed in the second reaction zone.

The reaction which takes place in the first reaction zone is the formation of a gaseous sub-oxide. Taking silica as an example of a starting material, the reaction is shown as follows:

$$SiO_2 + C \rightarrow SiO\uparrow + CO\uparrow$$

If a carbon precursor is used in the first reaction zone rather than carbon itself, then the carbon precursor must first be converted to elemental carbon. A separate reaction step is not usually required for this because the precursor carbonizes as the temperature of the first reaction zone is being raised to the temperature required for the generation of the sub-oxide, e.g. as the temperature passes through the 500°–750° C. range.

The oxides which can be used as the starting materials in the present invention include oxides of elements capable of generating a gaseous sub-oxide when heated with carbon in the first zone. As well as silica, a further example includes $B_2O_3$ and the like. The latter material forms $B_2O_2$ as a gaseous sub-oxide. On the other hand, oxides of titanium and tungsten are not suitable because their sub-oxides have insufficient volatility.

Instead of using the oxides, precursors which are converted to the oxides when heated may be employed. Examples include hydroxides, nitrates, sulfates and hydroxy chlorides of the elements concerned.

When a coating is formed by this route it is most desirable that:

a) it is uniformly formed around the fibres
b) that the coating is smooth and non-porous, and
c) that the fibres are not damaged or destroyed by the process.

In order to achieve this, it is important that:

a) conditions are maintained such that the sub-oxide penetrates the fibre mass completely and reacts equally with all the fibres, and
b) that the fibres are not damaged due to excessive reaction with the oxide at any place.

To coat the fibre satisfactorily it is important to carry out the coating process in the second zone, at a temperature between 1300° to 1600° C. (preferably 1525° to 1550° C. for SiC and 1300° to 1400° C. for $B_4C$). At higher temperatures, from 1600° to 1800° C., the strength of a fibre coated with SiC, for example, is weaker by several orders of magnitude than that obtained at 1525° C. This is because at, this temperature the transfer of the suboxide gas to the second zone is by gas transport, which also transports the concomitantly produced CO gas. The CO attacks the SiC coating and fibre to make SiO.

For the process to work well, steps should be taken to ensure a rapid and copious generation of the sub-oxide in the first reaction zone and a high partial pressure of the sub-oxide so that it adequately penetrates the porous mass in the second reaction zone. This is achieved by providing (a) a slight stoichiometrical excess (based on the sub-oxide-forming reaction) of microfine oxide or oxide precursor particles to carbon in the first zone (e.g. an excess of up to 20 or 25% of the oxide), (b) the presence of a catalyst for the sub-oxide reaction in the first reaction zone and (c) a suitably high temperature which depends on the identity of the sub-oxide but is normally in the range of 1300°–1600° C.

The actual ratio of oxide to carbon in the first zone depends on the particular oxide employed. In the case of silica, the stoichiometrical weight ratio for the reaction indicated above is 5:1 of silica:carbon, and the stoichiometrical molar ratio is 1:1. The slight excess of the oxide over the stoichiometrical quantity prevents the formation of carbide within the first reaction zone so that the sub-oxide gas is copiously and virtually exclusively formed.

Compounds of various metals, particularly potassium and iron in the presence of potassium, catalyze the formation of SiO and it is believed that other catalysts exist for the formation of sub-oxides of other elements. When using silica as a starting material, the presence of both iron compounds (e.g. iron oxides, particularly $Fe_2O_3$) and potassium compounds (e.g. $K_2O$) in the first reaction zone leads to a particularly pronounced catalytic effect. In the case of iron compounds, the amount employed should be kept fairly low (e.g. below 1% by weight based on the weight of silica) because the generation of SiO can otherwise be so rapid that little reacts with the carbon in the second reaction zone before the gas escapes. Moreover, if iron compounds are transferred from the first reaction zone to the second reaction zone, the iron may catalyze an undesired growth of carbide or nitride whiskers, instead of the formation of small particles, in the second zone (some whisker formation is usually unavoidable). On the other hand, there is no particular maximum for the amount of potassium employed in the first zone and, moreover, there is no particular minimum amount, either for the iron compounds or for the potassium compounds, except that the amount should be sufficient to produce the desired catalytic action.

The catalyst(s) for the sub-oxide forming reaction may simply be added to the reactants in the first zone before the reaction is commenced. More preferably, however, the catalyst(s) is finely dispersed in the oxide itself e.g. as an impurity. When silica is used as a starting material, it is preferable to use silica produced as a by-product from the vapour phase reactions carried out by the ferro-silicon industry. This type of silica is formed when silicon and silicon alloys are produced in submerged electric arc furnaces where quartz is reduced to silicon by carbon. SiO vapour is formed during this process and some of this gaseous SiO is entrained in the upper part of the furnace where it oxidizes and condenses to form very fine silica microspheres. A detailed discussion of this type of silica can be obtained from Ceramic Bulletin. Vol 63. No. 12 (1984). pp. 1487 to 1491. This type of silica is readily available on a commercial scale. e.g. from Elkem Chemicals. Inc. of Pittsburgh. Pa.. U.S.A. and is fairly inexpensive. Typically, silica of this type contains the following materials:

| Material | % by weight |
|---|---|
| $SiO_2$ | 92-97.0 |
| C | 1.0-3.0 |
| $Fe_2O_3$ | 0.10-0.50 |
| MgO | 0.20-0.50 |
| $Al_2O_3$ | 0.10-0.50 |
| $K_2O$ | 0.40-1.00 |
| $Na_2O$ | 0.10-0.60 |
| CaO | 0.10-0.50 |

Two specific examples (obtained from Elkem) are given as follows:

| | % by weight | |
|---|---|---|
| Material | EMS 960 | EMS 960 DA |
| $SiO_2$ (amorphous) | 94.7 | 96.3 |
| C | 2.8 | 0.9 |
| $Fe_2O_3$ | 0.1 | 0.1 |
| MgO | 0.2 | 0.2 |
| $Al_2O_3$ | 0.3 | 0.4 |
| $K_2O$ | 0.8 | 0.4 |
| $Na_2O$ | 0.4 | 0.1 |
| CaO | 0.3 | 0.1 |
| Particles less than 45 microns in size | 97.6% | >99% |

The average diameters in the silica spheres in the above examples is 0.2-0.3 microns.

In addition to catalyzing the sub-oxide reaction, it has been noticed that the presence of metallic compounds in the starting oxide advantageously helps the particles formed in the second reaction zone to sinter together, but the reason for this is not understood.

Rather than use a simple mixture of the starting oxide and carbon in the first reaction zone, it is necessary to use a uniform dispersion of microfine oxide (or oxide precursor) particles in a matrix of carbon or carbon precursor. This ensures that each minute oxide or oxide precursor particle is coated with carbon when the reaction commences, and thus provides a more rapid and complete generation of the sub-oxide. The coating of the oxide with carbon also helps to avoid direct contact between the oxide particles in the first reaction zone and the carbon substrate in the second reaction zone. This is very important, otherwise, the fibres in the second zone could become damaged by direct reaction with the oxide at a single spot.

The reactants in the first reaction zone are preferably in the form of small individual spheres or thin films. These can be formed, for example, by dissolving a carbon precursor such as polyacrylonitrile (PAN) in a suitable solvent (e.g. dimethyl formamide), adding the microfine oxide or oxide precursor and catalyst (if separate from the oxide), uniformly dispersing the solids in the solution to form an extremely homogeneous mixture, and shaping the dispersion while removing the solvent, e.g. by extruding or dripping the solution into a non-solvent for the carbon precursor (e.g. water in the case of PAN) which is miscible with the solvent. Due to the high affinity between the polymer and the oxide, each particle of the oxide is coated by the polymer. Apart from helping to avoid direct contact with materials in the second reaction zone, this step also helps to increase the rate of generation of the sub-oxide.

When a carbon precursor, such as PAN, is used, it should be present in the first reaction zone in an amount that produces the desired oxide to carbon ratio when carbonization of the precursor takes place as the first zone is heated up to the sub-oxide forming temperature. For example. PAN produces about 50% by weight of carbon when it is carbonized. The carbon yields of other precursors are either well known or can be determined by simple experimentation.

The first and second reaction zones should be closely adjacent to or in contact with each other so that the sub-oxide does not have far to diffuse. Rapid diffusion of the sub-oxide gas into the second zone is necessary for good penetration of the fibre mass.

As noted above, the reactant in the second reaction zone should consist of carbon fibres, fibres of an infusible carbon precursor or fibres of a high temperature resistant non-carbonaceous material coated with carbon or a carbon precursor. Generally, these fibres have a thickness of about 5-15 $\mu$. The fibres should preferably be packed together to a bulk density below about 1.0 g/cc. If the density is too high, the sub-oxide gas cannot easily diffuse into the fibrous mass. The thickness of the fibre layer in the second zone should also preferably be 1 cm or less, preferably about 5 mm or less, in order to allow good penetration of the sub-oxide gas. In fact, the density and the thickness of the second zone are interrelated in the sense that higher densities are permissible when the thickness of the zone is reduced so that the overall resistance to the diffusion of the gas is not too high. If desired, the second zone may consist of a woven or non-woven felt, fabric or paper made of carbon or the carbon precursor. For example, thin sheets of carbon paper (<0.5 mm) can be completely converted to carbide or nitride paper.

As the second zone is raised to the reaction temperature under a non-oxidizing atmosphere, the carbon precursor (if used) is carbonized as it passes through the carbonization temperature range (about 500°-750° C.) before it comes into contact with sub-oxide gas from the first reaction zone.

It is important that any carbon precursor used in the second zone be infusible since the desired fibrous shape would otherwise be lost and a fibre product would not be obtained.

Any thermostable polymer may be used as the precursor, e.g. PAN, phenol-formaldehyde or cellulose, etc. When PAN is used, it should be heat stabilized prior to use in order to render it infusible. Heat stabilization involves heating the polymer in air at a temperature of between 180° C. -250° C. for several hours to give a polymer product which has a density of about 1.3-1.5 g/cc and an oxygen content of about 8-15%.

It has been found that even when carbon fibres are used in the second reaction zone, the origin of the fibres can affect their reactivity. Fibres produced from polymers, particularly polyacrylonitrile, appear to be more reactive than fibres produced from tar and pitch.

As well as using fibres of carbon or a carbon precursor in the second reaction zone, it is also possible to use fibres of a heat resistant non-carbonaceous material coated with carbon or carbon precursor. Examples of suitable heat-resistant non-carbonaceous material include alumina, titania and even silicon carbide or tungsten carbide. The fibres of these materials can be provided with a coating of carbon or carbon precursor by dissolving a carbon precursor in a suitable solvent (e.g. PAN in DMF) and dip coating or spray coating the fibres with the solution. The solvent is then removed (e.g. by evaporation or solvent drying) and, if desired, the fibres can be heated in a non-oxidizing atmosphere to convert the carbon precursor to carbon.

The fibres employed in the second zone may be short chopped fibres randomly arranged to form a layer of the density and thickness mentioned above. Alternatively, much longer or even continuous fibres may be employed, e.g. in the form of a woven cloth, tow, non-woven web, paper-like sheets, etc. which may be arranged in or drawn continuously through the second reaction zone. When this procedure is employed, the layer of fibres formed by the woven cloth, tow, non-woven web, paper-like sheets, etc. should still have the required density and layer thickness mentioned above.

The temperature of the first reaction zone and the temperature of the second reaction zone should be essentially the same, or at least the temperature in the second zone should not be lower than that in the first zone. This is because the sub-oxide may convert to the oxide upon entering a cooler second zone and the oxide may contact the fibres and react with them.

To produce a coating of SiC, the material in the first zone comprises $SiO_2$ and carbon (produced from PAN) mixed in 1:1 molar proportion. The reaction takes place in two stages:

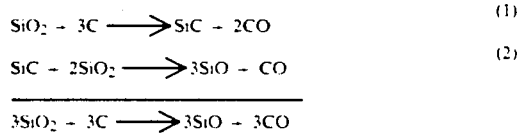

At temperatures below 1800° C., the second reaction takes place with SiO partial pressures below equilibrium level (<0.5 atm). However, in order that the coating formed be strong, smooth and non-porous, the reaction in the second zone should be conducted at a temperature below 1600° C. This means that the SiO formed is going to be at low partial pressure and hence it becomes very important to a) control the stoichoimetry of the material in the first reaction zone at the optimum level b) maintain the two zones in very close proximity c) control the density and thickness of the material in the second zone, and d) use a catalyst to control the accelerate SiO generation in the first reaction zone, and thereby to promote its diffusion away from this zone.

The reaction which takes place in the second reaction zone can be illustrated by the following equation which applies when $SiO_2$ is used as the starting material:

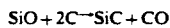

This reaction takes place in $N_2$ atmosphere at temperatures above 1500° C. Moreover, at temperatures between 1400°–1500° C. under an $N_2$ atmosphere, it is possible to obtain a coating of $Si_3N_4$ according to the following reaction:

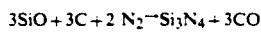

To obtain a coating of $B_4C$, the starting materials in the first zone should comprise $B_2O_3$ and carbon (preferably carbon black) in the stoichiometrical proportions (or a slight excess of $B_2O_3$) required to produce $B_2O_2$. This reaction takes place under an argon atmosphere at temperatures between 1300°–1600° C. At around 1600° C., it is exceedingly fast. The sub-oxide thus formed volatilises and diffuses to the second zone where it reacts with the carbon or carbon coated fibres to produce $B_4C$ as indicated below:

When SiC is produced using $SiO_2$, especially the silica from the ferro silicon industry containing catalytic impurities and stabilized PAN fibres in the second zone, a mixture of SiC whiskers and fibres is produced from which the fibres can be recovered by conventional separation methods. However, in such a case only discontinuous fibers of SiC are obtained as a product.

However, the whisker formation in the second zone can be prevented or minimised by taking the following steps.

1) Using carbon fibres as the carbon source in the second zone rather than precursor fibres such as stabilised PAN fibres. Whisker formation in the latter case is significantly higher.

2) Using a fabric of apparent density higher than 0.1 g/cm$^3$, preferably over 0.2 g/cm$^3$ but less than 1 g/cm$^3$. Whisker formation is significantly higher in the matrix which is of density lower than 0.1 g/cm$^3$. A woven or knitted fabric of carbon fibres comprise strands close packed which prevent formation of whiskers.

3) Increasing the ratio of material in the first zone to the second zone to more than 50% over the theoretical amounts required.

4) Using purer $SiO_2$ containing no iron but only potassium impurities further prevents whisker formation although this step is not critical.

Although the reaction to form SiC coating or fibres can take place at any temperature below 1600°; at lower temperatures i.e. between 1525°–1550° C., the quality of the SiC fibers produced is much superior. The grain size at these temperatures is smaller resulting in closely packed product and much smoother surfaces which are desirable for many applications. At higher temperatures, there is a possibility of recrystallization and weakening of the product formed.

In some forms of the present invention, complete reaction of the carbon in the second zone is not wanted and instead it is the intention to form fibres having a carbon core and an outer coating of carbide or nitride. Furthermore, by using fibres consisting of a core of a heat-resistant non-carbonaceous material and a coating of carbon or carbon precursor as the starting material in the second zone, it is possible to produce fibres having a core of the heat resistant non-carbonaceous material, an intermediate coating of unreacted carbon and an outer coating of carbide or nitride. Such fibres are produced by adjusting the weight ratios of the starting materials in the first and second zones to ensure that some but not all of the carbon in the second zone is reacted to form the carbide or nitride, leaving some unreacted carbon. The ratios necessary to achieve any desired coating thickness can readily be determined by simple calculation or experimentation.

The ratio of starting materials in the first zone to the starting materials in the second zone is extremely important in the present invention. In those cases where it is desirable to obtain only a coating, this ratio is maintained less than that required for complete conversion of the second zone product to fibres. The thickness of the coating can be varied by varying this ratio, in the sense that the higher the ratio, the greater the thickness of the coating formed.

When complete conversion is desired, it is necessary to provide a significant excess of the suboxide over that required for complete conversion of the second zone material. This excess has to be preferably over 50% and as much as 100% or more. In fact when the apparent density of the second zone is higher, a greater excess of the sub-oxide is required to ensure complete penetration and uniformity.

When the sub-oxide gas in the second reaction zone contacts the carbon in the second reaction zone, the surface layers of the carbon react and particles of carbide or nitride are formed on the fibre surfaces and sinter or fuse together at the reaction temperature, so an outer coating is formed which gradually becomes thicker as more of the carbon is consumed. The particles are of extremely small size, generally less than 1 $\mu$ and often about 0.2–0.3 $\mu$ or even less. Lower particle sizes are obtained at lower temperatures and the resulting material has a much smoother surface than those produced at higher temperatures. Whisker formation can be minimized by the methods indicated earlier and, after the particles have sintered or fused together, relatively smooth fibres are produced.

As indicated above, the temperature required in the second reaction zone depends on the starting materials employed and upon whether the product is to comprise a carbide or nitride. Generally, however, the temperature is at least about 1300° C. and is preferably in the range of 1300°–1600° C. When silica is used as the starting material and the product is to comprise SiC, the temperature should preferably be between 1525° and 1550° C.

As stated above, the atmosphere in both zones should be non-oxidizing. Unexpectedly, however, it has been found that the use of nitrogen is much preferred when coatings of SiF are to be formed because of the improved quality of the resulting coatings. The use of argon alone is not preferred, but mixtures of nitrogen and argon are satisfactory. In contrast, when coatings of B$_4$C are desired, argon is the preferred non-oxidizing gas.

When the product is to comprise a nitride, the atmosphere in the second zone should consist of or contain gaseous nitrogen or a compound (such as ammonia or an amine) which decomposes to nitrogen at the reaction temperature. A suitable temperature to result in nitride formation should also be employed.

Naturally, whether the carbide or nitride is a compound of silicon or boron depends on the identity of the oxide used in the first zone (SiO$_2$ or B$_2$O$_3$).

The two reaction zones can be formed by forming a first layer of the above-mentioned oxide (or oxide precursor) and carbon (or carbon precursor) mixture and a directly overlying layer of the porous mass of the infusible fibres. If desired, additional layers can be provided in alternating fashion, i.e. first a layer of the mixture, then a layer of the porous mass, and so on. The layer forming the first zone should be made quite thin, i.e. less than 10 cm, preferably less than 5 cm and more preferably less than 1 cm. As noted above, the layer forming the second zone must be made very thin, i.e. about 1 cm or less (and preferably about 5 mm) to allow adequate penetration of sub-oxide gas from the first reaction zone.

The reactions in the first and second zones take place under a suitable non-oxidizing atmosphere and in general the same atmosphere and reaction temperature is employed for both zones since they are normally located immediately adjacent to each other. To make a coating of SiC, the preferred non-oxidizing atmosphere is nitrogen; to make a coating of B$_4$C, the preferred atmosphere is Ar.

When it is desired to produce continuous fibres, the carbon or precursor fibres forming the second zone must be moved at a suitable speed through a reactor where they come into close proximity with a sub-oxide gas from a first reaction zone. One of the advantages of the process of the invention is that a fabric can be produced as the product directly rather than necessitating production of fibres which are then woven into a fabric.

The reaction may be carried out in a reactor that is slowly and continuously purged with the gas or gas mixture used to form the non-oxidizing atmosphere. The gas flow should preferably be arranged in such a manner that the gas flows first through the first reaction zone and then through the second reaction zone. This facilitates the diffusion of the sub-oxide gas, as it is produced, from the first reaction zone to the second. However, this is not absolutely essential because the sub-oxide produced has sufficient partial pressure at the reaction temperature to diffuse into the second zone without assistance.

The reaction can take place in any suitable reactor, and preferably a graphite-walled reactor is chosen in order to prevent contamination of the product. The reaction is normally complete after about 2 to 8 hours and the reactor is allowed to cool to ambient temperature before the non-oxidizing atmosphere is removed.

A quasi-continuous process can be carried out by alternately stacking first and second zones in numerous graphite bombs (cylindrical containers) and then feeding the bombs through a cylindrical oven heated in the central part to the appropriate high temperature.

The process of the present invention is intended to produce a fibrous product but it could also be used to form a carbide or nitride product on a shaped article (e.g. a film, plate, large body or other shaped product) made of, or coated with, carbon.

The invention is illustrated in further detail by the following Examples. The procedures described in the Examples were carried out in apparatus as shown in FIGS. 1 and 2 of the accompanying drawings and as briefly described below.

The induction furnace 10 consists of a silica tube 11 mounted on a base plate 12 and provided with an enclosed superstructure 13. Induction heating coils 14 are wrapped around the outside of the tube 11 in its central region and the furnace is provided with an inlet 15 and an outlet 16 for a non-oxidizing gas. The furnace contains porous insulating blocks 17 at the bottom of the tube 11, carbon felt insulation 18 located above the blocks, and a graphite reactor 19 embedded in the carbon felt insulation. The reactor 19 has a central vertical hole 20 which receives a graphite tube 21 extending downwardly from the superstructure 13. The tube 21 allows instruments, such as thermocouples or pyrometers, to be inserted into the reactor from outside the furnace to read the reactor temperature. etc.

Gas entering through inlet 15 diffuses through the porous bricks 17 into the carbon felt insulation 18 and then into the graphite reactor tube.

Figure 2:
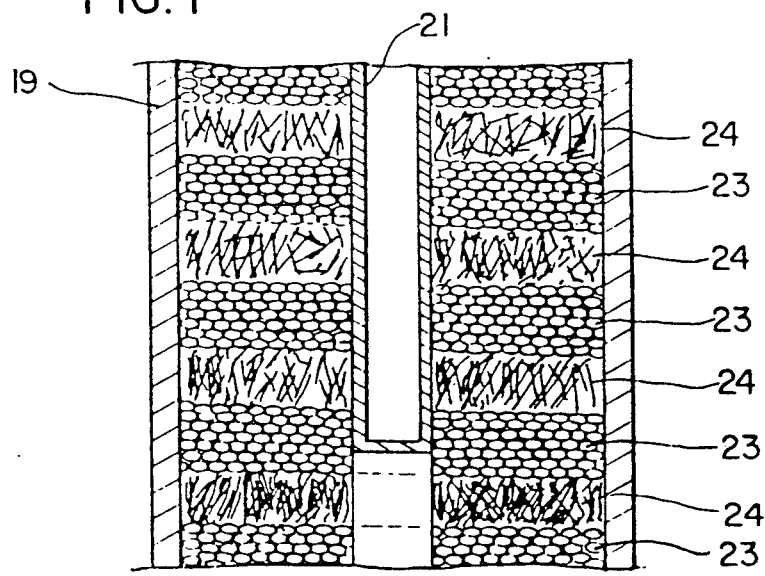
FIG. 2 is a partial cross-sectional view of the graphite reactor shown in FIG. 1 illustrating multiple layers of reactants forming the first and second zones.

The interior of the reactor 19 is shown in detail in FIG. 2. The reaction mass consists of a lower layer of spheres 23 (first zone) made of carbon or carbon precursor containing microfine oxide or oxide precursor particles, and an upper layer of carbon or carbon precursor fibres 24 (second zone). The layer of spheres forms the first reaction zone and the layer of fibers forms the second reaction zone. The layers are then alternately stacked to fill the reactor. The layer thickness in the second zone is maintained at less than 5 mm. The density of this layer is maintained at less than about 1.0 g/cc.

Effect of Catalyst on Rate of SiO Formation

The first two Comparative Examples below show the effect of the use of a catalyst for SiO formation in promoting the thickness of the SiC coating layer. However, because the silica was merely mixed with the carbon the products exhibited fiber damage due to some direct contact between the silica particles and the fibers.

COMPARATIVE EXAMPLE 1

Coating of SiC

Submicron $SiO_2$ (pure) from Degussa was mixed with carbon black in the proportion of 3:0.5. Carbon fibres were placed in the layer above the reactants in a graphite crucible. The reaction was carried out at 150° C. for 6 hours under an argon atmosphere. At the end of the test carbon fibres coated with SiC were obtained.

| | |
|---|---|
| Wt of Zone - 1 before | 3.006 g |
| Wt of Zone - 1 after: | 1.356 g (45.1% of original) |
| Wt of Zone - 2 (before): | 1.516 g |
| Wt of Zone - 2 (after): | 1.449 g |
| Wt of SiC formed in Zone - 2: | 6.25% (determined by oxidation) |

COMPARATIVE EXAMPLE NO. 2

Coating of SiC

An experiment similar to Comparative Example 1 was carried out except that 1.2% by weight of $K_2CO_3$ was added to the $SiO_2$.

The results are summarized as follows:

| | |
|---|---|
| Wt of Zone - 1 (before): | 2.969 |
| Wt of Zone - 1 (after): | 0.839 (28.2% of original) |
| Wt of Zone - 2 (before): | 1.499 |
| Wt of Zone - 2 (after): | 1.498 |
| Wt of SiC formed in Zone - 2: | 17.3% (determined by oxidation) |

The $K_2CO_3$ catalysed the SiO formation and therefore thicker coatings were obtained.

Conversion of Carbon Fabric to SiC

COMPARATIVE EXAMPLE NO. 3

$SiO_2$ (submicron $SiO_2$ from ferro silicon industry) and PAN powder from DuPont were mixed together in 2.8:1 proportion ($SiO_2$/C weight ratio 5:1). This formed the zone 1 material. Carbon fibre cloth form GLCC having an approximate thickness of 2 mm and a density of around 0.4 g/cm³ formed the zone 2 material. Four layers of zone 1 and zone 2 material were arranged in alternate fashion. The ratio of zone 1 to zone 2 material was 6:1 (68% excess SiO over theoretical required for complete conversion of zone 2 material). This material was calcined under $N_2$ atm at 1800° C. for 4 hrs.

At the end of the test, the weight gain in zone 2 material was 58.6% (95% of the theoretical). It was nearly completely converted to SiC. However, at large number of places, the $SiO_2$ had reacted with the carbon fibres directly and hole of about 4-5 mm in dia. had formed in the material rendering it unsuitable for any applications.

COMPARATIVE EXAMPLE NO. 4

Submicron $SiO_2$ from SKW (containing 0.2% $Fe_2O_3$ and 1.1% $K_2O$, 95% $SiO_2$) was used as the SiO source. This was dispersed in a 8% solution of PAN in DMF using a high shear blender. The weight ratio of the $SiO_2$ to PAN was maintained in 2.8:1. Into this 2% $NH_4HCO_3$ by weight (−100 mesh) was also dispersed. The resulting dispersion was divided into droplets and added into a bath containing 40:60 mixture of DMF and water for precipitating the polymer. The resulting hollow spheres were washed and dried at 110° C. The walls of these sphere comprised $SiO_2$ particles coated with the polymer. These spheres constituted the zone 1 material.

Zone 2 material comprised a carbon fibre cloth (obtained from GLCC) having a thickness of around 2 mm and an apparent density of about 0.4 g/cm³. The cloth and the sphere were arranged in alternate layers and calcined at 1700° C. for 2 hrs under $N_2$ atm. The ratio of the zone 1 to zone 2 material was 8:1 (124% excess SiO). At the end of the test the weight gain in the zone 2 material was 60.8% (96.4% of the theoretical).

The fibres in zone 2 were completely converted to SiC. There was no damage to the fibres as the oxide did not react directly with the fibres. Conversion was completed both inside and outside the matrix. Very few whiskers had formed owing to the high density of the matrix. However, the fibres had low strength.

Conversion of Fabric to SiC Coated Fabric

COMPARATIVE EXAMPLE NO. 5

Coating of SiC

Figure 3:
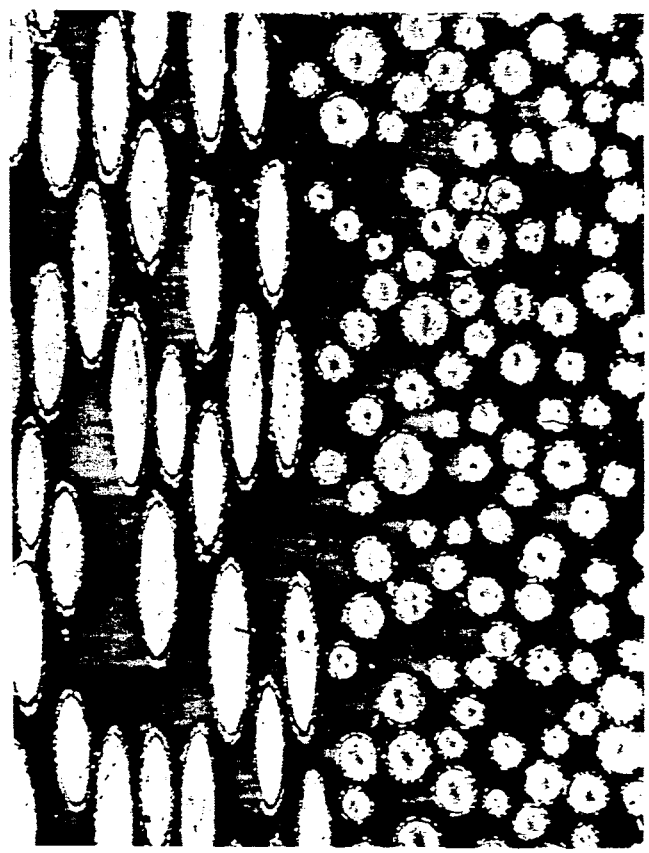
FIG. 3 is scanning electron micrographs ($\times 500$ magnification) of a product of Comparative Example 5.

Conditions were identical to Comparative Example No. 4 except that the ratio of zone 1 to zone 2 was maintained at 0.6:1. At the end of the test, the zone 1 material had completely disappeared. The weight gain in zone 2 was 7.9%. The percentage of SiC in the product was 18.3% (calculated). The product comprised fibres having a carbon core uniformly coated all around by SiC. After oxidation shells, of uniform thickness were left behind (FIG. 3). Practically no whiskers had formed in zone 2. The grain size was around 0.1–0.2 μs. However, the fibres had unsatisfactory low strength.

Coating of $B_4C$

COMPARATIVE EXAMPLE NO. 6

$B_2O_3$ and carbon black were mixed together such that the oxide was coated by the carbon black in the proportion by weight of 6:1. Stabilized acrylic fibre felt was used to form the upper layer in the reactor. The reaction was carried out at 1350° C. in argon for 5 hrs. X-ray diffraction of the fibres after reaction showed the presence of $B_4C$.

The results are summarized as follows:

| | |
|---|---|
| Wt of reactants (before): | 2.126 g |
| Wt of reactants (after): | 0.323 g |
| Wt of fibers (before): | 2.100 g |
| Wt of carbon coated fibers | 1.121 g |

Figure 4:
FIG. 4 is a similar micrograph (at greater magnification) of a product of Comparative Example 6.

These fibers were oxidized at 600° C. for 24 hours. The coating of $B_2O_3$ formed by oxidation of $B_4C$ can be seen in FIG. 4.

The product exhibited fiber damage due to direct contact between the oxide and the carbon fibers.

COMPARATIVE EXAMPLE NO. 7

$SiO_2$ from SKW was dispersed in an 8% solution of PAN in DMF. 1.5% $NH_4HCO_3$ was dispersed in the suspension. The ratio of $SiO_2$ to PAN was maintained at 2.8:1.0. The suspension was divided into drops by passing through an orifice and allowed to fall into a bath containing 40% DMF in water maintained at about 55° C. The DMF was extracted in the bath. Simultaneously, $NH_4HCO_3$ decomposed resulting in formation of hollow spheres of $SiO_2$ in PAN. The spheres thus produced were washed in water, dried and stabilized at 210° C. for 8 hours. The stabilized spheres were crushed to a size between 48 and 65 mesh for ease of distribution on the surface of the fibres. The crushed spheres formed the SiO forming mixture. The $SiO_2$ to carbon ratio in these was approximately 5:1.

A cloth of carbon fibres having a thickness of about 2 mm formed the second zone. The crushed beads were spread on both sides of the fibres such that the ratio of the beads to carbon fibres was 0.6:1. The reaction was carried out in a batch furnace at 1650° C. under argon atmosphere for 2 hours. The percentage of SiC on the surface was 11.1% (determined by oxidation). The coating was cohesive. The coated fibres were tested for mechanical properties. The tensile strength had decreased by 72% from the original level.

COMPARATIVE EXAMPLE NO. 8

This was identical to Comparative Example No. 7 except that the ratio of beads to carbon fibres was maintained at 0.4:1. The SiC coating formed was 4.76% by weight. However, the tensile strength in this case as well had decreased by 73%.

The Comparative Examples 7 and 8 demonstrate that although a uniform and cohesive coating can be formed on the surface of the carbon fibres at 1650° C., the mechanical properties such as strength are adversely affected. This demonstrates the need to lower the coating temperature to a level at which these properties are not affected.

COMPARATIVE EXAMPLE NO. 9

Crushed beads of $SiO_2$ and PAN (the same as those used in Comparative Examples 7 and 8) formed the SiO forming mixture. A tape of carbon fibres having a thickness of 2 mm formed the zone 2. The ratio of beads to carbon in zone 2 was 0.57:1. The reaction was carried out at 1500° C. for 2.5 hours under an argon atmosphere. The coating obtained was 11.28% by weight. The SiC coating was cohesive and uniform but the fibres were too weak to measure strength. This experiment demonstrates that the coating process does not work satisfactorily in all cases under an argon atmosphere.

EXAMPLE NO. 1

Crushed beads similar to those used in Comparative Example No. 7 constituted the SiO forming mixture (zone 1). A tape of carbon fibres formed the second zone (thickness 2 mm). The ratio of beads to the carbon in zone 2 was 0.61:1.0. The reaction was carried out at 1525° C. under $N_2$ for 1 hour. The amount of coating was 6.23%. The coating was cohesive and uniform. The loss in tensile strength was only 6% after coating.

EXAMPLE NO. 2

This was identical to Example No. 1 except that the ratio of beads in zone 1 to carbon in zone was 0.77:1.0. The amount of coating obtained was 8.78%. The coating was cohesive and uniform. The tensile strength of the coated fibres was somewhat higher than the original fibres.

EXAMPLE NO. 3

This was identical to Example No. 1 except that the reaction temperature was 1550° C., the residence time was 2 hours and the ratio of beads to C in zone 2 was 0.57:1. The coating obtained was cohesive and uniform. The strength of coated fibres decreased by 12%.

These Examples demonstrate that a good coating can be obtained by conducting the reaction under an $N_2$ atmosphere at a temperature of 1525° C. or 1550° C. As the partial pressure of SiO formed in zone 1 at this temperature is extremely low, the transport of SiO to the second zone can only take place by diffusion. This makes control of the thickness and density of zone 2, the proximity of the two zones and the catalysis to promote SiO formation critical to the success of the process.

EXAMPLE NO. 4

An 8% (by wt) PAN solution in DMF is prepared and $B_2O_3$ is dissolved in it such that the ratio of $B_2O_3$:PAN is maintained at 70:25 (corresponding to $B_2O_3$:C ratio of 70:12). The solution is then precipitated in a non-solvent such as acetone. The precipitated PAN-$B_2O_3$ and mixture (in which $B_2O_3$ is coated by PAN) forms the boron sub-oxide forming material. This is then organized in alternate layers over a 2 mm thick carbon fibre fabric such that the ratio of the fabric to the sub-oxide forming material is 1:0.2.

The reaction is carried out at 1350° C. for 3 hours under argon atmosphere. At the end of the test the carbon fibres are coated with a layer of $B_4C$ which is cohesive and uniform. The fibres are not damaged and their properties are not deteriorated.

What we claim is:

1. A process for preparing fibres consisting of or coated with a carbide or nitride substantially free of whiskers, which process comprises:

forming a first reaction zone and filling said first reaction zone with microfine particles of an oxide or oxide precursor of silicon or boron containing at least one catalyst for generation of a gaseous sub-oxide of silicon or boron uniformly dispersed in said oxide or oxide precursor, said particles being uniformly dispersed within a matrix of carbon or a carbon precursor, wherein the molar ratio of the oxide present as a starting material or derivable from the oxide precursor to the carbon present as a starting material or derivable from the carbon precursor is equal to or slightly greater than the stoichiometrical ratio required for the generation of a gaseous sub-oxide or silicon or said boron;

forming a second reaction zone closely adjacent to the first reaction zone, said second zone comprising a layer having a thickness of about 1 cm or less, and filling said second reaction zone with a porous mass having a density of about 1 g/cc or less formed of fibres selected from the group consisting of carbon fibres, fibres of a heat resistant non-carbonaceous material coated with carbon, fibres made of a carbon precursor and fibres made of a heat resistant non-carbonaceous material coated with a carbon precursor;

heating said first reaction zone in a non-oxidizing atmosphere which promotes the formation of sub-oxide to a temperature at which said carbon precursor, if present, is converted to carbon, said oxide precursor, if present, is converted to said oxide and then said gaseous sub-oxide is formed by the reaction of the oxide and carbon in the first reaction zone and the gaseous sub-oxide diffuses to the second reaction zone;

simultaneously heating said second reaction zone to a temperature no lower than that in the first reaction zone in a non-oxidizing atmosphere selected from nitrogen-free and nitrogen-containing atmospheres, and to a temperature at which said carbon precursor, if present, is converted to carbon, and at which the gaseous sub-oxide reacts with some or all of the carbon in the second reaction zone to form a substantially whisker-free carbide on said fibres or additionally with said nitrogen to form a nitride on said fibres; and separating the resulting fibres from any carbide or nitride whiskers that may also have been formed in the second reaction zone.

2. A process according to claim 1 wherein silica is used as said oxide in the first reaction zone.

3. A process according to claim 1 wherein said oxide used in the first reaction zone is $B_2O_3$.

4. A process according to claim 1 wherein said oxide precursor employed in the first reaction zone is selected from the group consisting of hydroxides, nitrates and sulfates of silicon or boron.

5. A process according to claim 1 wherein said oxide precursor employed in the first reaction zone is an hydroxy chloride of silicon or boron.

6. A process according to claim 1, wherein said carbon precursor used in said first reaction zone is an organic polymer.

7. A process according to claim 1, wherein said carbon precursor used in said first reaction zone is polyacrylonitrile.

8. A process according to claim 1, wherein a stoichiometrical excess of oxide to carbon is present in the first reaction zone as said sub-oxide is being formed.

9. A process according to claim 1, wherein said first reaction zone contains silica as said oxide and said catalyst is selected from compounds of potassium and mixtures of potassium and iron compounds, provided said iron compounds are present in an amount equal to or less than about 1% by weight based on the weight of said silica.

10. A process according to claim 1, wherein fume silica containing compounds of iron and potassium is used as said oxide in the first reaction zone, provided said iron compounds are present in an amount equal to or less than about 1% by weight based on the weight of said silica.

11. A process according to claim 1, wherein said first reaction zone is heated to a temperature in the range of 1300°–1600° C.

12. A process according to claim 1, for the preparation of SiC, wherein the first reaction zone is heated to a temperature of 1525° to 1550° C.

13. A process according to claim 1, for the preparation of $B_4C$, wherein the first reaction zone is heated to a temperature between 1300° and 1400° C.

14. A process according to claim 1, wherein the thickness of the second reaction zone is 5 mm or less.

15. A process according to claim 1, wherein the density of the porous mass in the second reaction zone is 0.1–1.0 g/cc.

16. A process according to claim 1 wherein the fibres in the second zone consist of or are coated with an infusible carbon precursor, or a precursor that has been made infusible.

17. A process according to claim 16 wherein said infusible carbon precursor is heat-stabilized polyacrylonitrile.

18. A process according to claim 1 wherein the fibres in the second reaction zone comprise a core of heat-resistant non-carbonaceous material and a coating of carbon or a carbon precursor.

19. A process according to claim 18 wherein the heat-resistant non-carbonaceous material is selected from the group consisting of alumina, titania, silicon carbide and tungsten carbide.

20. A process according to claim 1, wherein the fibres in the second reaction zone are randomly arranged fibres.

21. A process according to claim 1, wherein the fibres in the second reaction zone are fibres arranged in the form of a tow or fabric.

22. A process according to claim 1, wherein the fibres in the second reaction zone are arranged in the form of thin non-woven sheets.

23. A process according to claim 1, wherein the fibres in the second reaction zone are of indefinite length and are drawn through the second reaction zone at a speed which allows the carbide, nitride or boride reaction to take place.

24. A process according to claim 1 wherein the ratio of the weight of reactants in the first reaction zone to the weight of reactants in the second reaction zone is such that a stoichiometrical excess of the sub-oxide enters the second reaction zone relative to the amount of carbon in the second reaction zone.

25. A process according to claim 24 wherein the ratio is such that the stoichiometrical excess is at least 50%.

26. A process according to claim 24 wherein the ratio is such that the stoichiometrical excess is at least 100%.

27. A process according to claim 1, wherein the ratio of the weight of the reactants reaction zone to the weight of reactants in the second reaction zone is such that some, but not all, of the carbon in the second reaction zone reacts to form a carbide or nitride.

28. A process according to claim 1, wherein the temperature of the second reaction zone is in the range of 1300°–1600° C.

29. A process according to claim 1, wherein silica is employed as said oxide and the temperature in the second reaction zone is at between 1525° and 1550° C.

30. A process according to claim 1, wherein $B_2O_3$ is employed as said oxide and the temperature in the second reaction zone is at between 1300°–1400° C.

31. A process according to claim 1, wherein said first and second reaction zones are contiguous with each other.

32. A process according to claim 1, wherein there are a plurality of said first reaction zones and a plurality of said second reaction zones, said reaction zones being vertically stacked with said first and second reaction zones alternating.

33. A process according to claim 1, for forming fibres of said nitride, wherein said second reaction zone has an atmosphere containing nitrogen or a nitrogen precursor.

34. A process according to claim 1, for producing fibres consisting of or coated with SiC, wherein said non-oxidizing atmosphere comprises nitrogen.

35. A process according to claim 1, for producing fibres consisting of or coated with $B_4C$, wherein said non-oxidizing atmosphere comprises argon.

36. A fibre comprising a carbide or nitride prepared by a process according to claim 1.

* * * * *